United States Patent
Blaha

[19]

[11] Patent Number: 5,611,165
[45] Date of Patent: Mar. 18, 1997

[54] HUNTING SCENT HOLDER

[76] Inventor: Roger N. Blaha, 5725 Berry, Westland, Mich. 48185

[21] Appl. No.: 377,464

[22] Filed: Jan. 24, 1995

[51] Int. Cl.$^6$ ................................................ A01M 31/06
[52] U.S. Cl. .................... 43/1; 239/58; 248/126; 248/558
[58] Field of Search ................ 43/1, 124, 132.1, 43/131, 125, 129; 239/58, 56; 248/126, 518, 911, 558

[56]       References Cited

U.S. PATENT DOCUMENTS

| | | | |
|---|---|---|---|
| D. 189,086 | 10/1960 | Smith | D16/2 |
| 759,030 | 5/1904 | Sheaffer | 43/131 |
| 1,170,096 | 2/1916 | Nicholson | 248/126 |
| 2,763,453 | 9/1956 | Palino | 248/518 |
| 2,765,951 | 10/1956 | Wheeler | 239/58 |
| 2,959,354 | 11/1960 | Beck | 239/36 |
| 3,704,539 | 12/1972 | Alvarez | 43/131 |
| 4,361,279 | 11/1982 | Beacham | 239/56 |
| 4,523,717 | 6/1985 | Schwab | 239/56 |
| 4,558,820 | 12/1985 | Harris | 239/56 |
| 4,662,103 | 5/1987 | Cheng | 43/137.1 |
| 4,831,762 | 5/1989 | Harris | 43/17 |
| 4,969,599 | 11/1990 | Campbell | 239/58 |
| 5,048,218 | 9/1991 | Stewart | 43/1 |
| 5,210,974 | 5/1993 | Pence | 43/131 |
| 5,307,584 | 5/1994 | Jarvis | 43/1 |
| 5,361,527 | 11/1994 | Burgeson | 43/1 |
| 5,369,903 | 12/1994 | Cox | 43/1 |
| 5,477,640 | 12/1995 | Holtkamp | 239/58 |

FOREIGN PATENT DOCUMENTS 2078112  1/1982  United Kingdom ............... 239/56

Primary Examiner—Joseph J. Hail, III
Assistant Examiner—James Miner
Attorney, Agent, or Firm—Howard & Howard

[57]            ABSTRACT

A holder for holding an absorbent material carrying an animal attractant scent includes top and bottom portions that are movable relative to each other between enclosed positions and use positions. In the enclosed position, the interior of the pod containing the absorbent material is sealed. In the use position, ambient air can reach the interior such that the scent can escape. The pod is provided with an O-ring to seal the two members in the enclosed position. In addition, a stand is associated with the bottom portion to be inserted into the ground and position the pod above the ground. In a preferred embodiment, there are two stands with a first stand being used for positioning the pod at a first relatively high distance above the ground and a second stand for positioning the pod at a relatively lower distance above the ground. Both of the stands preferably pivot relative to the pod. The higher of the two stands is preferably formed of a flexible material such that it can be reconfigured into a smaller shape for storage. When reconfigured into a smaller enclosed shape, the stand allows the pod to be stored on a hook which may be carried on the hunter's belt.

20 Claims, 2 Drawing Sheets

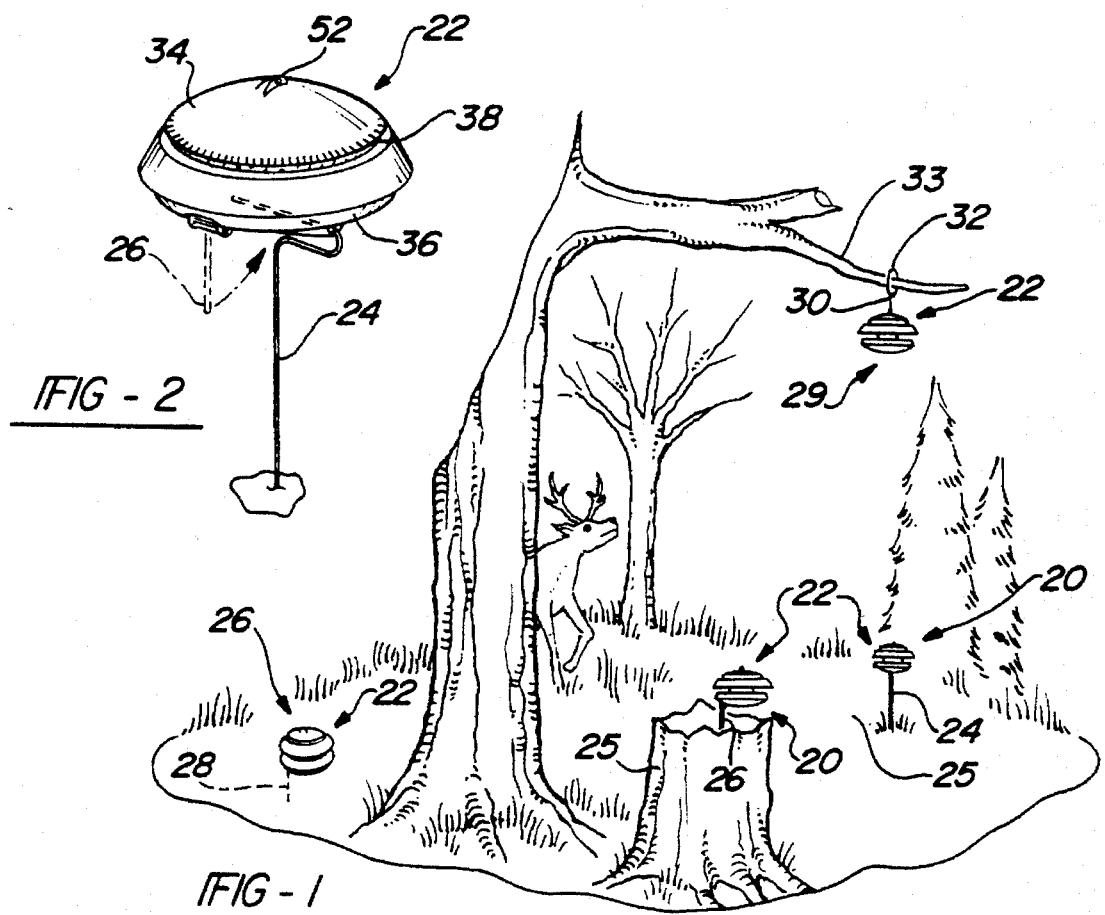
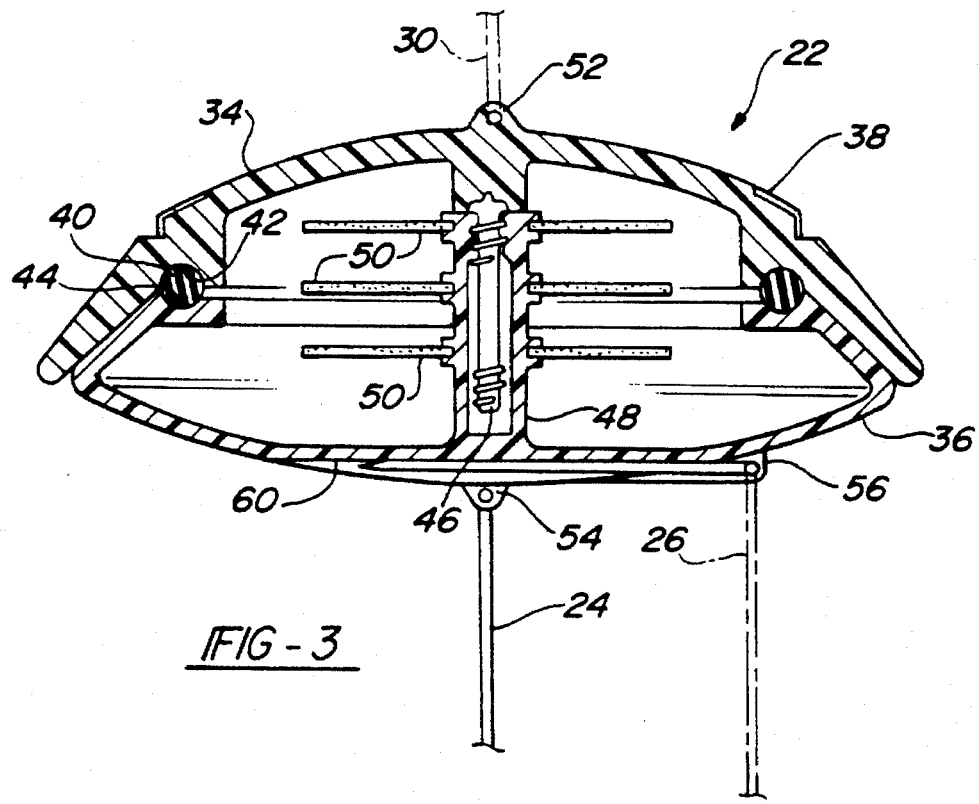

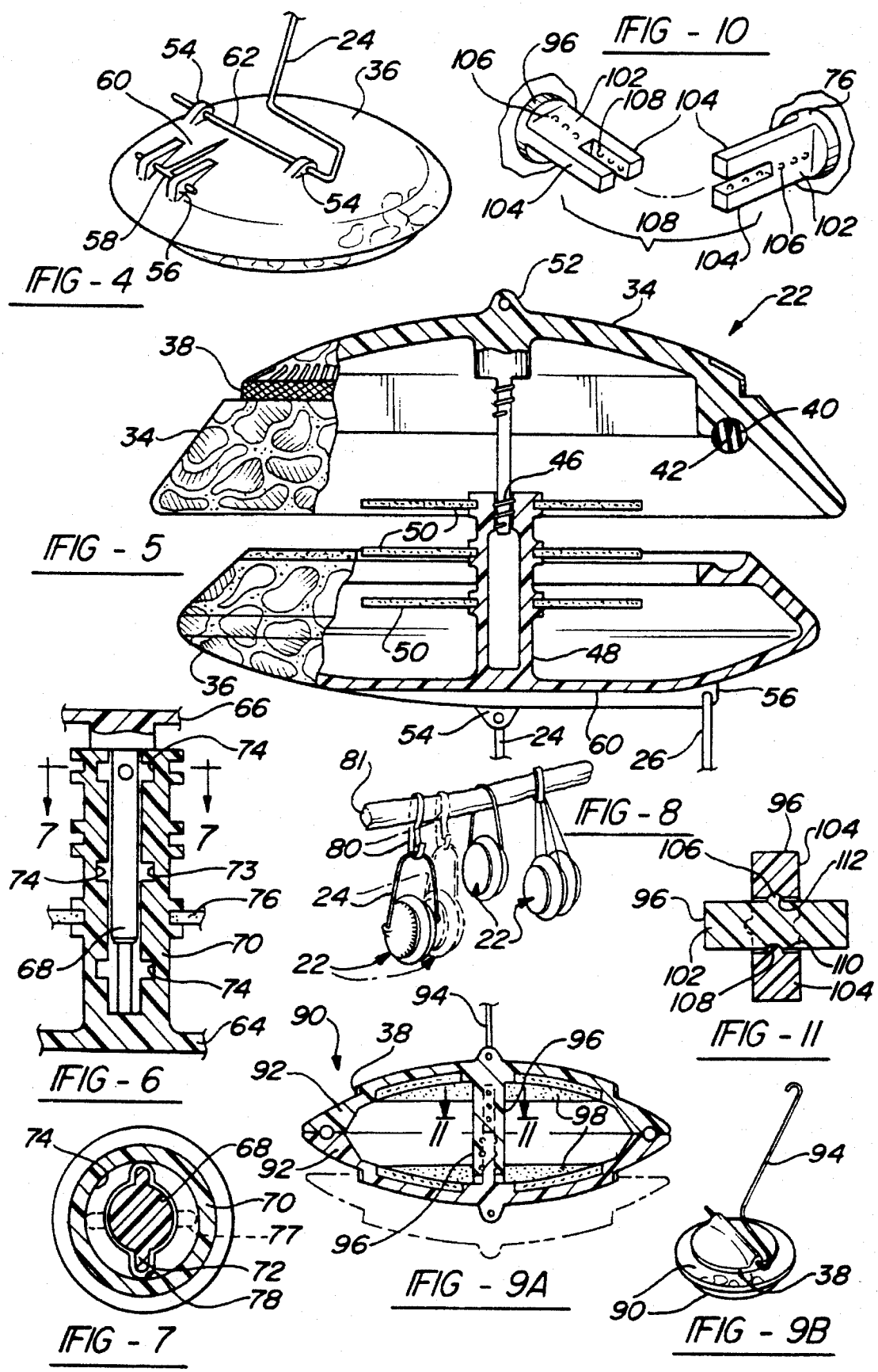

HUNTING SCENT HOLDER

BACKGROUND OF THE INVENTION

This application in general relates to a holder for holding a scent utilized to attract game.

Many aids and accessories are utilized in hunting. One type of accessory that has not been fully utilized are scents utilized to attract game. As an example, many types of scents are available for attracting deer to a particular area. The hunter will place the scent in an area near a hiding spot, and wait for deer to be attracted to the scent. Various types of scents are utilized, and these scents do attract game. One problem with the scents is that there have been no practical holders for holding the scent in the location desired by the hunter. The commercial scent holders are not easily used or transported, and do not keep the scent from being quickly dissipated.

Various types of scent holders have been proposed in the prior art, however, these scent holders have not been fully acceptable. As an example, U.S. Pat. No. 2,959,354 discloses a deer hunting lure consisting of a top and bottom member which enclose cotton saturated with an attracting scent. This holder is positioned through a loop at the top of the holder.

U.S. Pat. No. 4,523,717 discloses a similar holder, again which is held on a tree through a loop at the top. Similarly, U.S. Pat. Nos. 5,048,218 and 5,307,584 both disclose holders which are mounted on a tree.

There are several limitations inherent in this type of prior art. First, the holders can only be utilized with a tree having low branches. Second, there may be situations where it would be more practical to place the attracting scent adjacent the ground. It may appear more natural to the deer to have the scent near the ground.

At the same time, many of the above-referenced prior art devices are not compact. A hunter going into the field must minimize the weight and bulk of all objects that are being carried. As such, it would be desirable to minimize the size of the prior art holders as disclosed above.

SUMMARY OF THE INVENTION

In a disclosed embodiment of this invention, a hunting scent holder incorporates a holder pod portion incorporating top and bottom members that move between enclosed and use positions. In the enclosed position, a scent carrying pad is sealed within the two portions, thus preventing dissipation of the scent. In the operative position, the top and bottom portions are spaced such that the scent can escape. The pod is preferably attached to a stand member that positions the pod some distance above the ground by being placed within the ground. In one preferred embodiment, there is both a high stand and a lower stand. The high stand is preferably utilized to position the pod above higher grass or weeds, and the low stand is preferably utilized to position the pod above bare ground.

In a further preferred embodiment of this invention, one of the stands may be bent into an enclosed ring shape such that the entire pod can be hooked on a hook. The pods may then be easily carried by the hunter. In a further preferred embodiment, one of the stands pivots into a recess in the bottom portion. Further preferably, an O-ring is secured between the top and bottom portions. In a most preferred embodiment of this invention, there is a recess formed in one of the top and bottom members and a reflective tape is placed within this recess. Reflective tape allows a hunter to easily find the holders in the dark by merely shining a flashlight in the general area where the holders were placed.

In a method of carrying the holders according to the present invention, the high stand is preferably folded into an enclosed ring member. Several of the rings are then attached on a single hook. The hook allows the hunter to easily carry the pods into the field for hunting.

These and other features of the present invention can be best understood from the following specification and drawings.

BRIEF DESCRIPTION OF THE DRAWINGS

FIG. 1 is a view of the hunting scent holders in the field.

FIG. 2 is a perspective view of an inventive holder.

FIG. 3 is a cross-sectional view through a hunting scent holder according to the present invention.

FIG. 4 is a bottom view of one portion of the hunting scent holder of the present invention.

FIG. 5 is a view showing a use condition of the hunting scent holder of this invention.

FIG. 6 shows an alternative hunting scent holder.

FIG. 7 is a view along line 7—7 as shown in FIG. 6.

FIG. 8 shows one method of carrying the hunting scent holders according to this invention.

FIG. 9A shows yet another embodiment holder according to the present invention.

FIG. 9B shows another view of the FIG. 9A embodiment.

FIG. 10 shows one detail of the embodiment shown in FIG. 9A.

FIG. 11 is a cross-sectional view along line 11—11 as shown in FIG. 9A.

DETAILED DESCRIPTION OF A PREFERRED EMBODIMENT

FIG. 1 shows several hunting scent holders according to the present invention as utilized in the field. A first hunting scent holder 20 is shown having a scent pod 22 positioned at the top of a tall stand 24. Such a tall stand may be utilized when positioning the pod 22 above tall grass such as is shown at 25.

A second holder 26 is shown having its pod 22 positioned by a short stand 28 above the ground. Short stand 28 is preferably utilized when positioning the pod 22 above bare ground, or ground with very low ground cover.

A third hunting scent holder 29 is shown having its pod positioned with a hook 30 connected to a loop of string 32 which is received on a branch 33 of a tree. Other positions for pod 22, such as on a stump are made possible by this invention.

The inventive hunting scent holder allows the pod 22 to be positioned in any one of the illustrated positions, or several other positions. At the same time, the inventive hunting scent holder is maintained as a compact assembly that is not unduly burdensome for a hunter to carry into the field.

FIG. 2 shows a view of the holder using the high stand 24 to position pod 22 at a relatively high position above the ground. Low stand 26 is shown in phantom. In this use position, the low stand 26 is likely to be folded within the recess which will be described below.

FIG. 3 is a cross-sectional view of the hunting scent holder, including its pod 22. As shown, pod 22 consists of an upper portion 34 which is attached to a lower portion 36. A ring of reflective tape 38 is positioned within a recess in the top portion 34. Tape 38 is reflective, such that a hunter will be able to find the holder by shining a flashlight at the holder. This can become important when the hunter wishes to gather the holders in the dark. The hunter will be able to quickly find the several holders that may be positioned in any area.

An O-ring 40 is positioned within a pair of O-ring grooves 42 and 44 formed respectively on top portion 34 and bottom portion 36. O-ring 40 preferably remains within groove 44, and seals the connection between the top and bottom portions 34 and 36 when the pod 22 is in the enclosed position shown in FIG. 3. In this closed position, the O-ring insures that the scent which may be placed within the pod does not dissipate. The pod 22 is preferably kept in this position during transport or storage.

A threaded downwardly extending stem 46 extends from top portion 34 into an internally threaded boss 48 extending upwardly from the bottom portion 36. Pads 50 are placed outwardly of boss 48. The scent is placed upon pads 50, and the pads 50 may be easily replaced. The pads 50 may be any sort of cotton or other absorbent material.

As shown, the upper hook 30 is attached through a hook connection 52. The tall stand 24 is attached to a connection 54 and the short stand 26 is attached to a connection 56.

The details of the hook connections 54 and 56 can be best understood from FIG. 4, which is a bottom view of bottom portion 36. As shown in FIG. 4, connection 54 includes two spaced portions with a portion 62 of tall stand 24 extending between the two portions 54. The tall stand 24 is sufficiently strong such that it can support the pod 22 at a height above the ground. At the same time, the tall stand 24 is preferably formed of a flexible wire that is preferably rubber coated. Such wire is also commonly known as shrink wrapped wire. As an example, 18 gauge wire may be utilized. The flexible wire may be folded into a configuration for transport, or storage. Should the short stand 26 be used, or should the upper hook 30 be used to place the pod 22 in position, then the tall stand 24 may be folded into an enclosed position wherein it does not interfere with the positioning of the pod 22.

The short stand 26 is attached to a shaft 58. Shaft 58 is preferably received between two connections 56 and can pivot relative to the connections 56. A recess 60 is preferably formed in the bottom of bottom portion 36, and short stand 26 can be fully received within recess 60. Should the upper hook 30 be utilized, then low stand 26 is preferably received within recess 60, such that the stands 24 and 26 provide no obstruction.

As shown in FIG. 5, the pod 22 is in its operative position. Top portion 34 has been unthreaded relative to lower portion 36. At the same time, the threaded connection between stem 46 and boss 48 is maintained, it is just the top and bottom members 34 and 36 are slightly spaced. In this position, the pads 50 are exposed to ambient air, and the scent will escape. As shown in FIGS. 3 and 5, more than one pad 50 may be utilized. Alternatively, only a single pad need be used. In addition, for changing the pads, the top portion 34 may be fully removed from the bottom portion 36 by further unthreading the two.

FIG. 6 shows a partial view of another embodiment pod 63. Pod 63 incorporates a bottom portion 64 and a top portion 66. Top portion 66 is formed with a stem 68 extending downwardly into a boss 70. Ears 72, FIG. 7, are formed with stem 68 and are selectively received within recesses 74 within boss 70. In this way, the upper portion 66 may be turned between locking and movement positions relative to the lower portion 64. Of course, the ears and recesses can be reversed with the ears received on the boss 70 and the recesses received on the stem 68. As shown, a pad 76 is received outwardly of the boss 70 with this embodiment.

As shown in FIG. 7, the recesses 74 incorporate slots 78 which extend throughout the entire length of the internal surface of the boss 70. There are in this embodiment recesses 74 formed at three axial locations within the boss 70. A user may move the upper member to a closed position for storage, or may move the post upwardly such that the ears 72 are received in the upper groove 74 when the pod is in use. At the same time, if the ears are aligned with the slot 78, the upper portion 66 can be fully removed from the lower portion 64. When the user is moving the upper portion 66 to a locked position relative to the lower portion 64, the upper portion 66 is merely turned relative to the lower portion 64 until the ears are no longer aligned with slot 78. The ears are then received within the groove 74, as shown in phantom at 77 in FIG. 7. In this position, the upper portion 66 is locked relative to the lower portion. In yet another alternative unillustrated embodiment, a spiral groove may guide an ear relative to the boss 70 such that it may be turned all the way downwardly to a locked storage position, but may be turned slightly upwardly to a use position wherein the top portion 66 is still secured to the lower portion 64. Various combinations of this structure would be well within the skill of a worker of ordinary skill in the art.

As shown in FIG. 8, the high stand 24 can be folded into an enclosed hook shape, and then hooked on a hook 80. Alternatively, other pods 22 are shown wrapped around a belt 81 for ease of transport. This facilitates the carrying of several of the pods 22. As stated above, it is one desire of all hunters to minimize the bulk of items that must be carried into the field, and thus the provision of a simple belt hook for storing several of the scent holder pods 22 is a significant benefit.

FIG. 9A shows yet another embodiment pod 90. Pod 90 is formed of two identical halves 92, which are connected together as will be described below. A single positioning member 94 may be utilized to secure pod 90 to a tree, or alternatively may be used as a high stand to position pod 90 above the ground. The single positioning member 94 is preferably formed of a bendable wire as was the high stand 24. This embodiment allows the use of a single molded part to achieve both halves of the pod 90. In addition, the single positioning member 94 still provides the pod with the ability to be positioned to any one of several positions. Reflective tape 38 is still included in this embodiment. As shown, each pod half 92 includes a connection post 96 which will be described below. In addition, with this embodiment, there is a mass of absorbent material 98 which receives the scent. FIG. 9B shows details of how the member 94 is connected to the half 92.

As shown in FIG. 10, the post 96 incorporates a flat upper portion 102, and two descending leg portions 104. Flat portion 102 includes bumps 106, and one of the legs 104 includes bumps 108. The two posts 96 are positioned interlocking into each other, and allow movement of the two halves 92 relative to each other between the enclosed and use positions.

As shown in FIG. 11, the bumps 106 formed on the flat portion 102 of a first of the posts 96 would be received within recesses 112 formed in the leg 104 of the other of the posts 96. At the same time, the bumps 108 formed on the other of the legs 104 is received within recesses 110 in the opposed side of the flat portion 102 from the bump 106. The flat portion 102 of the second post 106 would be received between the two legs 104 of the first post 96. In this way, the two halves may be easily moved relative to each other between the use and storage positions. In addition, the two may be fully separated for changing material 98.

Preferred embodiments of this invention have been disclosed, however, a worker of ordinary skill in the art would recognize that certain modifications would come within the scope of these inventions. For that reason the following claims should be studied to determine the true scope and content of this invention.

I claim:

1. A holder for holding scents utilized in attracting animals comprising:

a pod portion for holding a scent carrying material, said pod portion incorporating two halves that are movable relative to each other between an enclosed position wherein the interior of the pod is sealed preventing dissipation of the scent material, and to a use position wherein said two halves are spaced from each other such that the scent can escape the pod; and a stand member for positioning said pod a distance above the ground, said stand member being configured to be inserted into the ground, and being capable of supporting said pod a distance above the ground, said stand also allows said pod to be supported a distance above the ground, and is bendable such that said stand also allows the pod to be supported on a tree by being reconfigured such that it could be hooked onto a tree to support said pod.

2. A holder as recited in claim 1, wherein said holder is associated with two distinct stands, with said two stands providing two levels of positioning of said pod above the ground at two distinct vertical levels.

3. A holder as recited in claim 1, wherein said stand pivots relative to one of said halves.

4. A holder as recited in claim 3, wherein said two halves include a top and bottom portion, and said stand is mounted on said bottom portion and pivots relative to said bottom portion.

5. A holder as recited in claim 4, wherein said stand is also bendable to minimize its size when not in use.

6. A holder as recited in claim 5, wherein said stand is bendable such that an end of said stand may be bent back against its length to form a loop such that it may be carried on a hook.

7. A holder as recited in claim 3, wherein said holder carries a top hook to allow said pod to be attached to a member for securing said pod to a support structure spaced upwardly from the ground.

8. A holder as recited in claim 3, wherein said stand pivots into a recess in one of said halves for storage when not in use.

9. A holder as recited in claim 1, wherein one of said halves has a reflective portion.

10. A holder as recited in claim 1, wherein said stand is bendable to minimize its size when not in use.

11. A holder as recited in claim 1 wherein said stand pivots into a recess in one of said half portions when not in use.

12. A holder as recited in claim 1, wherein an O-ring seal is received between said two halves, said O-ring seal providing a fluid-tight seal between said two halves when said two halves are inset in closed position.

13. A holder as recited in claim 1, wherein said two halves are connected together by a threaded member that allows the movement between said use and enclosed positions.

14. A holder as recited in claim 1, wherein said two halves are connected by members which are selectively rotatable relative to each other for locking said two halves together at a particular axial location, and which may be rotated relative to each other to allow relative axial movement of said two halves.

15. A holder as recited in claim 1, wherein said two halves are identical, and have interlocking structure that allows selective axial movement of said two halves between said enclosed and use positions.

16. A holder for holding scents utilized in attracting animals comprising:

a pod portion for holding a scent carrying material, said pod portion incorporating two halves that are moveable relative to each other between an enclosed position wherein the interior of the pod is sealed preventing dissipation of the scent material, and to a use position wherein said two halves are spaced from each other such that the scent can escape the pod;

a stand for positioning said pod a distance above the ground, said stand member being configured to be inserted into the ground, and being capable of supporting said pod a distance above the ground; and said holder carrying a top hook to allow said pod to be attached to a member for securing said pod to a support structure spaced upwardly from the ground.

17. A holder for holding a scent containing absorbent material for attracting animals comprising:

a scent containing pod including top and bottom portions, said top and bottom portions being movable relative to each other between an enclosed position wherein said scent containing material is not exposed to ambient air such that scent on said absorbent material is not dissipated, said top and bottom portions being movable to a use position wherein ambient air has access to the internal space of said pod such that the scent is dissipated;

a seal provided between said top and bottom portions providing a fluid tight seal between said top and bottom portions when said top and bottom portions are in said storage position;

a stand for supporting said pod at a distance above the ground, said stand being structured to be inserted into the ground and support said pod a distance above said ground, said stand pivoting relative to said bottom portion of said pod, and said stand being formed of a bendable material such that it may be bent into a smaller size when not in use, and a single positioning member providing said stand, and further allowing said pod to be supported a distance above the ground, such that said stand also allows said pod to be supported on a tree by being bendable.

18. A holder as recited in claim 17, wherein said top and bottom portions include interlocking members which can lock said top portion relative to said bottom portion at desired axial positions, but wherein said top portion may be rotated relative to said bottom portion to allow movement of said top and bottom portions between said positions.

19. A holder as recited in claim 17, wherein said top and bottom portions include a threaded connection that allows adjustment of the axial location of said top and bottom portions and movement between said use and enclosed positions.

20. A holder as recited in claim 17, wherein said top and bottom portions are formed as identical members.

* * * * *